March 16, 1965  P. MÜLLER  3,174,064
MEANS FOR BRAKING A ROTATABLE ELEMENT
Filed July 20, 1960
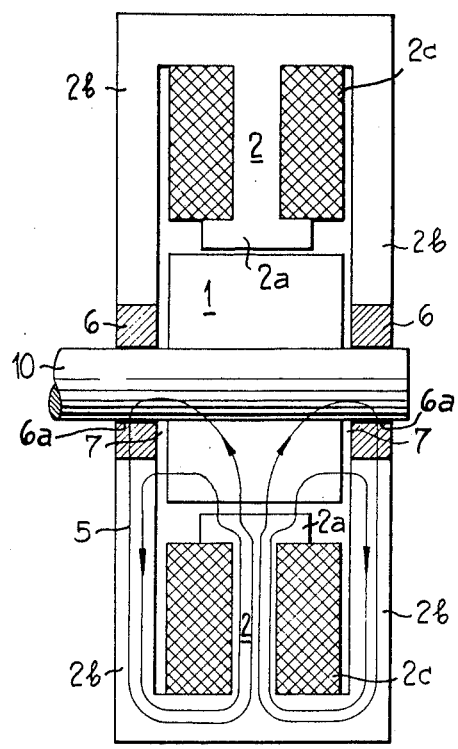
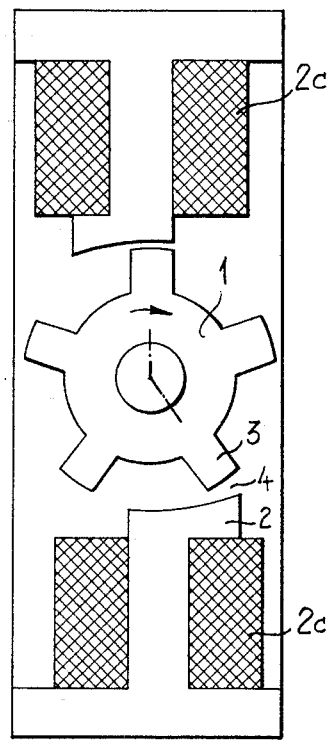
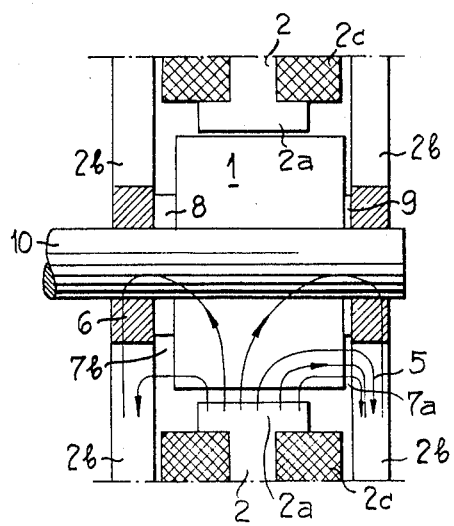
INVENTOR
PAUL MÜLLER
BY Werner W. Kleeman
ATTORNEY

United States Patent Office 3,174,064
Patented Mar. 16, 1965

3,174,064
MEANS FOR BRAKING A ROTATABLE
ELEMENT
Paul Müller, Bad Godesberg-Mehlem, Germany, assignor to Ringsdorff-Werke G.m.b.H., a corporation of Germany
Filed July 20, 1960, Ser. No. 44,078
Claims priority, application Germany, July 23, 1959, R 26,018
10 Claims. (Cl. 310—77)

The present invention relates generally to a method of and means for destroying the kinetic energy of a rotatable element and, more particularly, to an electromagnetic braking action for braking a rotor element magnetically driven by one or more stator elements, as for example employed in a counting mechanism, such as an impulse counter which records conditions of an external system.

Although for convenience of description the teachings of the present invention are described in conjunction with an impulse counter it will be readily apparent that it is equally possible to apply such teachings to any device employing rotor and stator elements, and where braking of the rotor element is desirable. The term impulse used hereinafter is to be taken in a general sense as not only applying to electrical impulses but to any external condition of a system which is to be counted or recorded.

Impulse counters wherein each impulse or condition of an external system actuates a suitable switching member to cause a rotatable element, as for example, a magnetic rotor to be angularly displaced through a predetermined angle of given magnitude generally require some sort of braking arrangement for destroying the kinetic energy when the desired final position of the rotatable element is reached. In counters operating with small impulse frequencies, that is to say, at relatively low rates of revolution per unit time, the inherent bearing friction generally suffices to cause the rotatable element to come to rest after some oscillations about its final position.

It will, of course, be apparent that the design of the counter or the like must be carried out in such a manner as to provide the necessary friction. Such will be the case if a pole or pole group operating simultaneously produces an unbalanced torque so that a corresponding radial bearing pressure is created. However, counters in which simultaneously operating poles are diametrically opposed, such as normal four pole arrangements, produce pure torques without substantially any radial bearing pressure. As a result of the relatively small bearing pressure, such counters are only useful for relatively low impulse frequencies because their rotatable members oscillate about their final position for a considerable length of time due to the absence of some sort of suitable frictional braking.

Such oscillations are not permissible in counters for high impulse frequencies, that is, those operating at relatively high rates of revolutions per unit time. Firstly, there exists the danger that the rotatable element will record a step too much or too little owing to overshoot during its forward or return movement in view of lack of proper braking. Furthermore, the oscillations of the rotatable element continue for some time so that the frequency limit of the counter is undesirably reduced. Moreover, such oscillations cause undue wear of the bearings of the counter during each counting operation, such wear greatly reducing the life of the bearings in comparison to those of a periodically or systematically braked counter.

In contradistinction, the present invention contemplates effective braking of a rotatable element in order to obviate these aforementioned disadvantages, employing an electromagnetic type braking action wherein a rotatable element is magnetically driven from a region of lesser magnetic flux intensity into one of greater intensity, the increase of the magnetic flux intensity being employed to effectively brake the rotatable element at the proper instance of time. In one proposed construction the region of increased magnetic flux causes a breakdown of the lubricating film in the rotor bearings so that a condition of semi-dry friction exists for braking of the rotor. Another proposal relies upon exerting a bending moment on the rotor shaft of sufficient magnitude to cause binding of the respective faces of stator and rotor for braking of the latter. A further construction relies upon the differing widths of respective air gaps so that the increased magnetic flux intensity appearing in the region of the smaller air gap exerts an axial force which brakes the rotor. Finally, there is provided an arrangement employing a frictional brake, such as a brake shoe, which is control actuated at the proper instance to brake the rotor.

Accordingly, it is an important object of the present invention to provide a method of and means for effectively braking a rotatable element.

It is another object of the present invention to provide means for displacing a rotatable element from a region of lesser magnetic flux intensity into one of greater flux intensity wherein the increase of flux intensity is employed to effectively brake said rotatable element.

Another object of the present invention is to provide means for braking a rotatable element by relying upon the difference in magnetic flux intensity appearing in air gaps of differing widths.

A further object of the present invention is the provision of electromagnetic braking means wherein magnetic flux is employed to break down a lubricating film for effectively braking a rotor element.

Another object of the present invention is the provision of means wherein magnetic flux is utilized to exert a bending moment on a rotor shaft for frictionally engaging rotor and stator elements to brake the rotor.

These and other objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 is a sectional view of a rotor element and associated stator elements adapted for use in a counter and illustrating symmetrical magnetic flux;

FIGURE 2 is an end view of the device shown in FIGURE 1; and

FIGURE 3 is a fragmentary showing of rotor and stator elements similar to those of FIGURE 1 but provided with air gaps of different widths for braking of the rotor.

One proposed possibility for effectively electromagnetically braking a rotatable element, such as a magnetically driven rotor, consists of employing the change of friction in an overloaded plain bearing for the purpose of braking the rotor, particularly in an oil-impregnated sintered bearing. In conventional type counters, the rotor element is magnetically driven in a predetermined rotational direction into the tapered air gap of the attracting stator field pole. The radial pulling force exerted on the rotor element which increases proportional to the square of the magnetic induction B, is considerably increased in magnitude during movement of said rotor element, reaching a maximum value when said rotor element including one pole face thereof comes into its final position opposite a pole face of a stator element. This radial pulling force must, however, be taken up by the bearings. If these bearings are made small enough for their lubricating film to be broken before the final position of the rotor and maximum radial pressure is reached, a condition of semi-dry friction arises in the bearing whereby the coefficient of friction or frictional factor is several times greater than that of liquid friction under which the bearing was initially operating so that effective braking results. If the sintered bearing is formed of a material where the coefficient of friction for dry friction relative to the rotor shaft is large, as for example, sintered iron provided with suitable impregnating substances, a good braking action may be obtained dependent on the magnetic field strength, that is to say, in accordance with the angular position of the rotor element. Such impregnating substances are, for example, oils of relatively low viscosity so that the oil film will be forced back into the pores of the sintered bearing even under relatively small loads. The effectiveness of such a mode of braking can readily be appreciated by observing the varied differences of the coefficient of friction for the various types of friction, to wit, about .005 to .01 for liquid friction, .05 to .1 for semi-dry, and .2 or more for dry friction.

In consideration of the foregoing, and with reference to FIGURES 1 and 2, there is provided a rotor element 1 having radially extending rotor pole faces 3 disposed between electromagnetic stator means 2 having stator pole faces 2a and lateral side portions 2b constituting a frame. It will of course be apparent that the stator means 2 and side portions 2b of the frame may be separate elements suitably secured to one another if so desired. The rotor element 1 is mounted for rotation on the rotatable shaft 10, which in turn is supported by the bearings 6 which preferably are sintered and provided with a suitable impregnating substance, such as low viscosity oil, providing an oil film or lubricating film 6a, for the reasons detailed hereinabove. The rotor element 1 is shown interposed at equal air gap spacing 7 from the lateral side portions 2b of the frame to provide symmetrical magnetic flux circuit 5. Suitably provided field windings 2c adapted to be energized from a suitable power souce (not shown) cause said rotor element 1 to be magnetically driven in the direction of the arrow (see FIG. 2) so that the rotor pole face 2 moves into the tapered air gap 4 from a region of lesser magnetic flux intensity to a region of greater magnetic flux intensity. Correspondingly, the radial pressure exerted on the bearings 6 will cause a breakdown of the lubricating film 6a so that substantial surface to surface contact of rotor shaft 10 and bearing 6 results to provide a condition of semi-dry friction for effectively braking said rotor element 1.

Similarly, a very effective braking action may also be obtained by making the air gap 4 between stator pole faces 2a and the rotor pole segments 3 so narrow in the final position of the rotor element 1, that the large magnetic forces caused thereby in the radial direction may not only destroy the bearing lubricating film if one is provided, but additionally bend the rotor shaft 10 a sufficient amount (some hundredths of a millimeter) so that at least one of the pole segments 3 of the rotor element 1 comes into binding or frictional contact with one of the pole faces 2a of the stator means 2 for braking said rotor element 1. As soon as the excitation of the field windings 2c is discontinued, the bending moment applied to the rotor shaft 10 is released and said shaft will return into its normal position so as to disengage the rotor element 1 in preparation for its following operational step.

In impulse counters and the like wherein the magnetic flux enters the rotor element 1 from the stator means 2 and then axially passes to the bearing means 6, as can be seen in FIGURES 1 and 3, a further principle of electromagnetic braking already mentioned hereinabove can be applied with particular efficaciousness. Such further principle of braking by providing lateral air gaps of differing widths is illustrated in FIGURE 3, wherein the basic elements of rotor and stator are similar to those described with reference to FIGURES 1 and 2, like reference numerals denoting similar elements. In FIGURE 3, however, thin spacers or washers 8 and 9 of unequal thickness and formed of a non-magnetic material are disposed between the rotor element 1 and the lateral end portions 2b of the frame to provide lateral air gaps 7a and 7b therebetween of differing widths, as shown exaggerated in FIGURE 3. The narrower air gap 7a lying in the region of greater magnetic flux intensity will exert an axially directed force component on the bearing 6 so that a braking action in dependence on the strength of the magnetic flux results. In FIGURE 1 where the lateral air gaps 7 are of equal widths the axial force components tend to cancel one another. As clearly shown in FIGURE 3, the lines of magnetic flux 5 pass largely through the smaller air gap 7a to thus provide the desired axial pressure on the adjacent bearing 6.

Having thus described the invention what is claimed as new and desired to be secured by United States Letters Patent is:

1. In a counter for counting impulses and the like received from an external system, a rotatable shaft, electromagnetic stator means provided with lateral side portions constituting a frame cooperating with said rotatable shaft to support the latter, a rotor element mounted on said rotatable shaft between said lateral side portions of said frame, and means disposed between at least one lateral side portion of said frame and said rotor element to provide respective air gaps of differing widths between said lateral side portions and said rotor.

2. In a counter for counting impulses and the like received from an external system, a rotatable shaft, electromagnetic stator means provided with lateral side portions constituting a frame, bearing means carried by said lateral side portions supporting said rotatable shaft, a rotor element carried by said rotatable shaft between said bearing means and adapted to be magnetically driven by said stator means upon energization thereof, and means interposed between said bearing means and said rotor element to provide respective air gaps of differing widths between said lateral side portions of said frame and said rotor, the magnetic flux resulting from energization of said electromagnetic stator means is greatest in the region of the air gap of smaller width whereby an axial force is exerted on said rotor in the direction of said air gap of smaller width for braking said rotor.

3. In a counter for counting impulses and the like according to claim 2, said means for providing said air gaps being spacer elements of differing widths.

4. In a counter for counting impulses and the like received from an external system, a rotatable shaft, electromagnetic stator means provided with lateral side portions constituting a frame cooperating with said rotatable shaft to support the latter, said stator means being provided with stator pole faces, a rotor element having rotor pole faces mounted on said shaft between said lateral side portions of said frame at a predetermined distance from said stator pole faces, means for energizing said electromagnetic stator means to magnetically drive said rotor element in such a manner that at least one rotor pole face is rotatably advanced toward at least one stator pole face into a region of substantially maximum magnetic flux intensity of predetermined magnitude, whereby a force is applied on said rotatable shaft to exert a bending moment on said rotatable shaft of sufficient magnitude to deflect said one rotor pole face into frictional contact with said one stator pole face for effectively braking said rotor element.

5. In a counter for counting impulses and the like received from an external system, a rotatable shaft, electromagnetic stator means provided with lateral side portions constituting a frame, bearing means provided with a lubricating film carried by said lateral side portions supporting said rotatable shaft, said stator means being provided with stator pole faces, a rotor element having rotor pole faces mounted on said rotatable shaft between said lateral side portions of said frame at a predetermined distance from said stator pole faces, means for selectively energizing said electromagnetic stator means to magnetically drive said rotor element in such a manner that at least one rotor pole face is rotatably advanced toward at least one stator pole face into a region of substantially maximum magnetic flux intensity of predetermined magnitude, to thereby apply an asymmetrical magnetic force on said rotatable shaft to exert a radially directed force component on said bearing means to break down said lubricating film so that substantial surface to surface contact of said rotatable shaft and said bearing means results to define a condition of at least semi-dry friction to effectively brake said rotor element.

6. In a counter for counting impulses and the like according to claim 5, said bearing means being a sintered bearing provided with an impregnating material.

7. In a counter for counting impulses and the like according to claim 6, wherein said bearing means upon breakdown of said lubricating film provides a high coefficient of friction.

8. In a counter for counting impulses and the like according to claim 5, wherein said bearing means are small enough and the intensity of said magnetic flux great enough to cause said breakdown of the lubricating film.

9. In a counter for counting impulses and the like received from an external system, a rotatable shaft, electromagnetic stator means provided with lateral side portions constituting a frame cooperating with said rotatable shaft to support the latter, said stator means being provided with stator pole faces, a rotor element having rotor pole faces mounted on said shaft between said lateral side portions of said frame and spaced from said stator pole faces, means for selectively energizing said electromagnetic stator means to magnetically drive said rotor element in such a manner that at least one rotor pole face is rotatably advanced toward at least one stator pole face from a region of smaller magnetic flux intensity into a region of greater magnetic flux intensity to provide an asymmetrical magnetic force of sufficient magnitude and operating upon said rotor element to brake the latter.

10. A method of braking a step-wise moving rotatable element after each step-wise movement; comprising the steps of magnetically driving the rotatable element in a step-wise manner from a region of lesser magnetic flux intensity into a region of greater magnetic flux intensity, and utilizing the increased magnetic flux to exert an asymmetrical magnetic force which is sufficient to effectively brake said rotatable element upon completion of each step-wise movement.

References Cited by the Examiner
UNITED STATES PATENTS

| | | | |
|---|---|---|---|
| 1,639,038 | 8/27 | Jobst | 310—77 |
| 2,824,272 | 2/58 | Delaporte | 310—49 |

MILTON O. HIRSHFIELD, *Primary Examiner.*